Aug. 25, 1936.                    P. F. SHIVERS                    2,052,537
                            MODULATING VALVE CONTROL
                     Filed Nov. 1, 1930              3 Sheets-Sheet 1
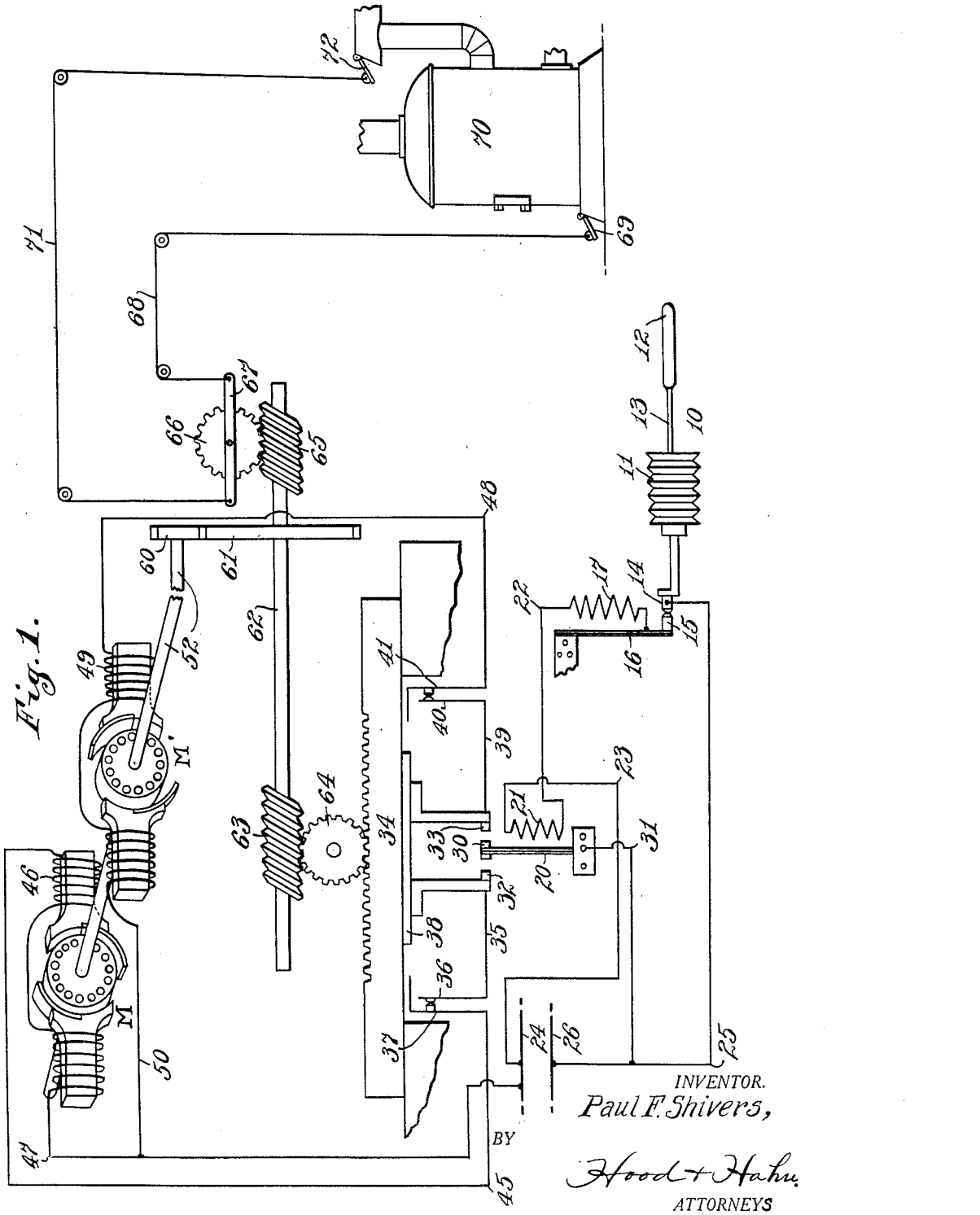
INVENTOR.
Paul F. Shivers,
BY
Hood + Hahn
ATTORNEYS

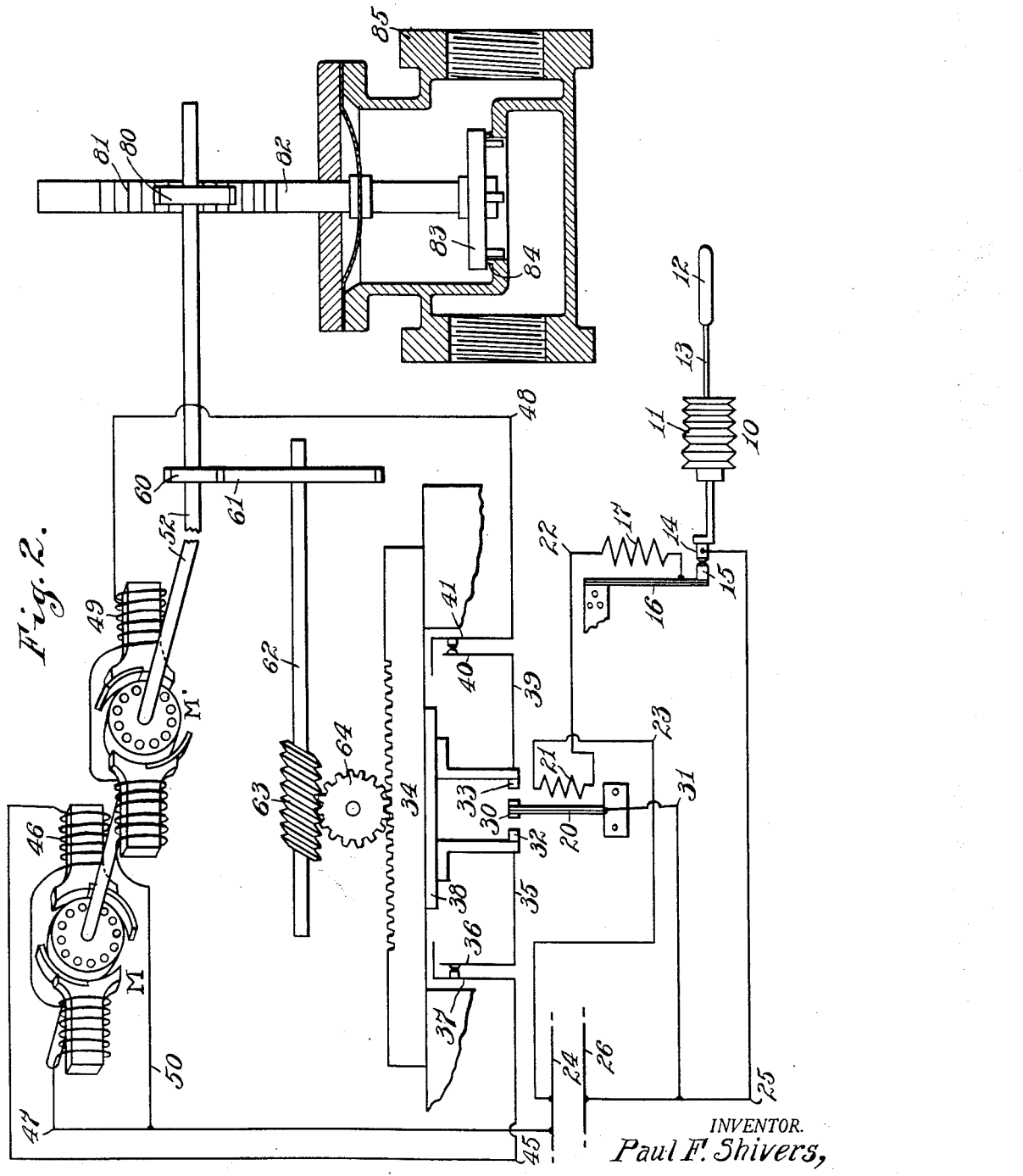

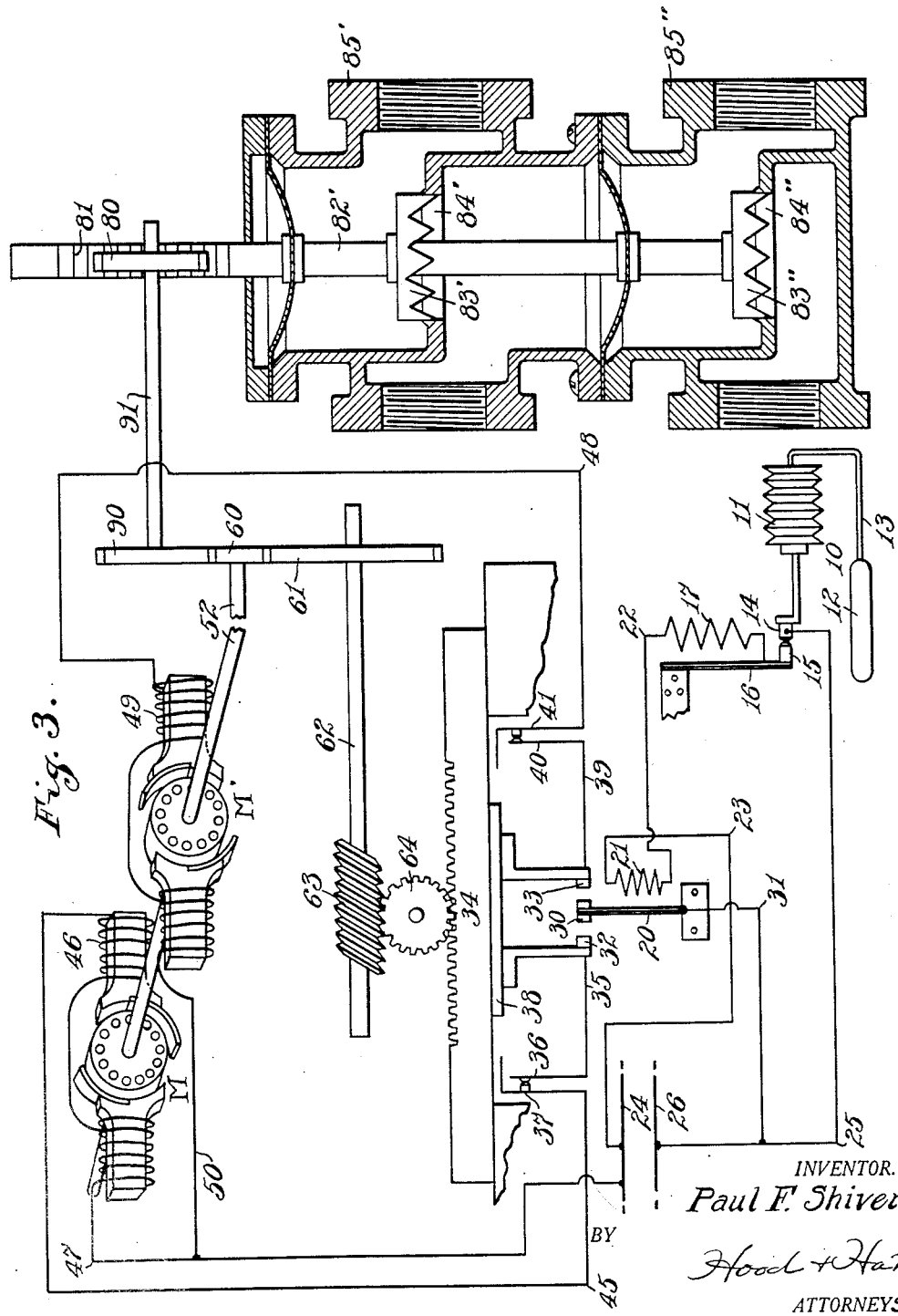

Patented Aug. 25, 1936

2,052,537

UNITED STATES PATENT OFFICE 2,052,537

MODULATING VALVE CONTROL

Paul F. Shivers, Wabash, Ind., assignor to Minneapolis-Honeywell Regulator Company, Minneapolis, Minn., a corporation of Delaware Application November 1, 1930, Serial No. 492,744

3 Claims. (Cl. 236—68)

The object of my present invention is to provide electro-thermostatic mechanism wherein a power delivery element may be caused to assume and maintain a definite position desired by reason of the temperature at a given point, the power delivery element being positioned by a reversible electric motor which also positions terminals of the electro-thermostatic mechanism, whereby the power delivery element may be not only shifted to, but substantially maintained in a multiplicity of positions within its range of movement in accordance with the temperature conditions at a remote point.

More specifically, the object of the invention contemplates the utilization of the electrically-driven power delivery element for positioning a valve or valves, which, in some instances, will control the effectiveness of a heater arranged to affect the primary thermostatic element of the mechanism.

The accompanying drawings diagrammatically illustrate my invention.

Fig. 1 is a diagram of such an apparatus arranged to manipulate the draft and check dampers of a house-heating furnace;

Fig. 2 is a diagram of a similar apparatus wherein the power delivery element is connected to the movable element of a flow-controlling valve, and, Fig. 3 is a diagram of a similar arrangement wherein the power delivery element is connected to the movable elements of two flow-controlling valves for coordinated movement whereby the two fluids delivered to the valves may have their rates of flow proportioned in accordance with temperature conditions at a remote point.

In the drawings 10 indicates a thermostatic element to be placed at a desired remote point and in the diagrams this thermally-responsive element comprises an expansible and collapsible bellows 11 and a capsule 12 connected to the interior of the bellows by tube 13, the structure being designed to contain an adequate quantity of volatile liquid. The movable element of the bellows 11 carries an electric terminal 14 arranged to coact with an electric terminal 15 carried by a bi-metallic thermostatic blade 16 which is generally less responsive to temperatures of the ambient medium than the thermostat 10, although not necessarily so, the blade 16 being arranged to respond to temperature variations in the same directions of movement as terminal 14. Associated with blade 16, so as to locally heat it, is an electric heating coil 17. A second thermostatic bi-metallic blade 20, preferably, though not necessarily arranged to serve as an electrical conductor, is provided with a heater coil 21, one end of which is connected by wire 22 with one end of coil 17, the opposite end of said coil 17 being connected to terminal 15 (through blade 16 as shown in the drawings). The other end of coil 21 is connected by wire 23 with the power line 24 and terminal 14 is connected by wire 25 with the power line 26. The blade 20 carries a double-ended electric terminal 30 which is connected by wire 31 with power line 26 (in the present instance through blade 20 and wire 25.)

Arranged for cooperation with opposite ends of terminal 30 are terminals 32 and 33 spaced apart so that, in middle positions of the terminal pair 32—33 and the terminal 30, there will be no electrical contact.

The terminals 32 and 33 are insulated from each other and supported by a slidable rack bar 34. Terminal 32 is connected by wire 35 with the terminal 36 normally contacted by a spring terminal 37, a portion of which is projected into the path of movement of a projection 38 carried by rack 34. Terminal 33 is connected by a wire 39 with a terminal 40 which is contacted by a spring terminal 41, a portion of which is projected into position to be engaged by the projection 38 of rack bar 34, said projection 38 lying between and having opposite one-way coaction with the two spring terminals 37 and 41.

Terminal 37 is connected by a wire 45 with one end of the field coil 49 of a shaded-pole repulsion motor M, the opposite end of said field coil being connected by wire 47 with line 24.

Terminal 41 is connected by a wire 48 with one end of the field coil 49 of a shaded-pole repulsion motor M', the opposite end of said field coil being connected by wire 50 with line 24 through wire 47.

The armatures of the two motors M and M' are conveniently carried by the same shaft 52 and therefore the fields of the two motors are arranged to produce relatively opposite rotation.

Shaft 52 carries a pinion 60 meshing with a gear 61 carried by a shaft 62 which carries a quick-pitch thread 63 meshing with a pinion 64 which meshes with rack 34. Shaft 62 also carries a quick-pitch thread 65 which meshes with a gear 66 carrying a lever 67, one arm of which is connected by cable 68 with a draft damper 69 of the warm air furnace 70, and the other arm of which is connected by cable 71 with the check damper 72 of furnace 70.

The operation is as follows:

Upon rise of temperature of thermostat 10 to or above a desired minimum, terminal 14 will contact with terminal 15, thus completing the circuit 26, 25, 14, 15, 17, 22, 21, 23, 24 and coils 17 and 21 will be heated to affect blades 16 and 20. The heating of blade 16 causes retraction of terminal 15 from terminal 14 and the heating of blade 20 causes said blade to shift terminal 30 to the left. (Fig. 1.) Upon separation of terminal 15 from terminal 14 the heating coils 17 and 21 will cool and the blades will cool so that contact is again established between terminals 14 and 15. There will thus be set up a cycle of alternate contacting and non-contacting of terminals 14 and 15, and alternate energization and deenergization of coils 17 and 21, so that an amount of heat will be currently delivered (as an average), to coil 21 to cause blade 20 (and terminal 30) to assume and maintain a definite position depending upon the position to which terminal 14 is ultimately urged by reason of the temperature of the ambient medium of thermostat 10.

Assuming terminals 32 and 33 to be in their medial positions, projection 38 of rack bar 34 will be out of contact with both of the spring terminals 37 and 41 so that said terminals will be in contact with their respective companion terminals 36 and 40. When blade 20 is heated by heater 21, its free end will swing to the left and cause terminal 30 to contact with terminal 32, thus establishing the circuit 26, 31, 20, 30, 32, 35, 36, 37, 45, 46, 47, 24, thus energizing motor M causing it to rotate in a clockwise direction, thereby rotating shaft 62 (through gears 60, 61), to shift terminal 32 away from terminal 30 and to rotate pinion 66 in a counter-clockwise direction to raise damper 72 and lower damper 69, more or less, depending upon the position to which blade 20 is urged by the average heating effect of heater 21. As soon as terminal 32 separates from terminal 30, movement of motor M ceases and consequently the position to which the power delivery element 67, and consequently dampers 69 and 72, will be shifted, will depend upon the position to which blade 20 is distorted as a result of the coaction between terminals 14 and 15. The parts will be so set that terminal 14 will come into contact with terminal 15 when the temperature of the ambient medium of capsule 12 is somewhat below the desired maximum, and such that damper 69 will be fully closed and damper 72 fully opened when the ambient medium of capsule 12 has reached the desired maximum. Blade 20 will have reached the limit of its movement to the left and the separation of terminal 32 from terminal 30, by the action of motor M will have brought terminal 33 close to terminal 30 so that it will be contacted thereby promptly upon any cooling of blade 20. As the ambient medium of capsule 12 drops terminal 14 will recede from terminal 15 and the free end of blade 20 will move to the right, thus contacting terminal 33 and closing the circuit 26, 31, 20, 30, 33, 39, 40, 41, 48, 49, 50, 47, 24, thus energizing motor M' causing it to rotate in a counter-clockwise direction to shift rack bar 34 to the right and to swing lever 67 to move damper 69 in an opening direction and damper 72 in a closing direction.

In actual practice, assuming adequate fuel to be supplied to the furnace, the parts will generally so adjust themselves that dampers 69 and 72 are moved but little to one side or another from intermediate positions which are approximately correct to maintain a fire closely approximating that required to maintain the temperature of the ambient medium of capsule 12.

The device thus differs quite radically from the common type of damper control comprising a damper-shifting motor movable to one extreme (draft damper fully open) or to the other (draft damper fully closed), as a result of movement of a thermostatic element arranged to be affected by the heat of the room and where no intermediate positions of the draft and check dampers can be approximately maintained.

If by chance bar 34 should be moved too far by the action of motor M or M', projection 38 will contact with terminal 37 or 41 and thus break the circuit of motor M at 36—37 or that of motor M' at 40—41.

In the construction shown in Fig. 2 the parts 10 to 64, inclusive, are the same as in Fig. 1. The shaft 52 (which in this instance is the power delivery element of the claims), is extended and carries a pinion 80 meshing with a rack 81 carried by the stem 82 of movable valve member 83 coacting with the seat 84 of the valve casing 85 through which fluid flow is to be modulated.

In the arrangement shown in Fig. 3 the parts 10 to 64, inclusive, are as in Fig. 1. Pinion 60 meshes with a pinion 90 carried by shaft 91 which carries a gear 80 meshing with a rack 81 carried by stem 82' to which are secured the two modulating valves 83' and 83'' which coact respectively with the seats 84' and 84'' of the valve casings 85' and 85''.

In the constructions shown in Figs. 2 and 3 the movable valve elements will be positioned in accordance with the positioning of blade 20 under the action of heater 21, the average heat delivery of which will be determined by the coaction between terminals 14 and 15.

I claim as my invention:

1. A heating system comprising a heat-supplying unit provided with a control element by means of which the heat-delivery capacity of the heat-supplying unit may be varied, two oppositely driven electric motors each having a rotary power delivery element directly geared to said control element through speed-reducing gearing to respectively affect said control element in opposite directions, a thermostatic element and associated terminal variably positioned in response to variations in temperature of a space heated by the heat-supplying unit, a second thermostatic element and associated terminal positioned coactive with said first terminal, a third thermostatic element, two electric heaters arranged to respectively thermally position said second and third thermostatic elements, an energizing circuit comprising said two heaters and said first and second terminals, an oppositely shiftable terminal-carrying element, reducing gearing between said two motors to oppositely affect said terminal carrying element, and energizing circuits for said two motors comprising coacting terminals carried respectively by said third thermostatic element and terminal-carrying element for alternately closing and opening said last-mentioned energizing circuits.

2. A heating system comprising a heat-supplying unit provided with a control element by means of which the heat-delivery capacity of the heat-supplying unit may be varied, two oppositely driven electric motors each having a rotary power delivery element directly geared to said control element through speed-reducing gearing to respectively affect said control element in opposite directions, a thermostatic element and associated terminal variably positioned in response to variations in temperature of a space heated by the heat-supplying unit, a second thermostatic element and associated terminal positioned coactive with said first terminal, a third thermostatic element, two electric heaters arranged to respectively thermally position said second and third thermostatic elements, an energizing circuit comprising said two heaters and said first and second terminals, an oppositely shiftable terminal-carrying element, reducing gearing between said two motors to oppositely affect said terminal carrying element, and energizing circuits for said two motors comprising coacting terminals variably coordinated by said third thermostatic element and said terminal-carrying element to alternately energize the circuits of said two motors.

3. A heating system comprising a heat-supplying unit provided with a control element by means of which the heat-delivery capacity of the heat-supplying unit may be varied, two oppositely driven electric motors each having a rotary power delivery element directly geared to said control element through speed-reducing gearing to respectively affect said control element in opposite directions, a thermostatic element and associated terminal variably positioned in response to variations in temperature of a space heated by the heat-supplying unit, a second thermostatic element and associated terminal positioned coactive with said first terminal, a third thermostatic element, two electric heaters arranged to respectively thermally position said second and third thermostatic elements, an energizing circuit comprising said two heaters and said first and second terminals, an oppositely shiftable terminal-carrying element, reducing gearing between said two motors to oppositely affect said terminal carrying element, and energizing circuits for said two motors comprising coacting terminals carried respectively by said third thermostatic element and terminal-carrying element for alternately closing and opening said last-mentioned energizing circuits, each of said last-mentioned energizing circuits comprising a limit switch acting, upon arrival of said last-mentioned terminal-carrying element at a predetermined maximum position, to break its motor circuit.

PAUL F. SHIVERS.